United States Patent [19]

Hoffman, III

[11] Patent Number: 4,707,069

[45] Date of Patent: Nov. 17, 1987

[54] OPTICAL FIBER COUPLER PACKAGING ARRANGEMENT AND A METHOD OF MANUFACTURE THE SAME

[75] Inventor: Arthur J. Hoffman, III, Roanoke, Va.

[73] Assignee: U.S. Holding Co., Inc., New York City, N.Y.

[21] Appl. No.: 820,914

[22] Filed: Jan. 17, 1986

Related U.S. Application Data

[63] Continuation of Ser. No. 416,442, Sep. 10, 1982, abandoned.

[51] Int. Cl.⁴ .................................................. G02B 6/38
[52] U.S. Cl. ................................. 350/96.21; 350/96.20
[58] Field of Search ................ 350/96.20, 96.21, 96.23

[56] References Cited

U.S. PATENT DOCUMENTS

| | | | |
|---|---|---|---|
| 4,171,867 | 10/1979 | Cocito | 350/96.21 |
| 4,235,511 | 11/1980 | Yonecki | 350/96.23 |
| 4,272,155 | 6/1981 | Slaughter | 350/96.23 |
| 4,348,076 | 9/1982 | Oldham | 350/96.21 |
| 4,404,010 | 9/1983 | Bricheno et al. | 350/96.21 |
| 4,460,820 | 7/1984 | Matsumoto et al. | 350/96.21 |

Primary Examiner—Robert E. Wise
Attorney, Agent, or Firm—Christie, Parker & Hale

[57] ABSTRACT

A protective arrangement for an optical fiber coupler includes a substantially cross-sectionally V-shaped support element which bounds an open channel that receives a portion of the optical fiber coupler. The portion received in the open channel incudes jacketed regions, continuing into bare regions and a coupling region. Respective adhesive bodies secure the jacketed regions of the optical fiber coupler in the open channel of the V-shaped support element. A strip-shaped support element is connected by respective additional bodies of adhesive to the bare regions of the fiber just outside the coupling region. The support elements are of a material having a coefficient of thermal expansion approximating that of the material of the optical fiber coupler. A shrunk tubular shielding element tightly surrounds the V-shaped support element over most of its length and its open ends are closed by respective seals. Shrunk tubular bend limiters surround the jacketed regions of the optical fiber coupler and pass through the respective seals. This sub-package is so inserted into a receiving channel of a housing member that the open side of the open channel of the V-shaped support element faces the bottom surface of the receiving channel. A body of encapsulating material embeds the subpackage and holds the same in position within the receiving channel.

8 Claims, 3 Drawing Figures

OPTICAL FIBER COUPLER PACKAGING ARRANGEMENT AND A METHOD OF MANUFACTURE THE SAME

The government has rights in this invention pursuant to Contract Nos. No 0173-800027 and N-00173 -80-047 awarded by the Department of the Navy.

This application is a continuation of application Ser. No. 416,442, filed Sept. 10, 1982, now abandoned.

BACKGROUND OF THE INVENTION

The present invention relates to optical fiber couplers in general, and more particularly to an arrangement for and a method of packaging such optical fiber couplers.

Optical fiber couplers of various constructions are already known and in widespread use, especially in the telecommunications field. Generally speaking, such optical fiber couplers render it possible to interconnect individual optical fibers in such a manner that the modulated light propagating through an input optical fiber leading to the optical fiber coupler continues to propagate through at least one output optical fiber leading from the optical fiber coupler after passing through the latter. In some of the conventional optical fiber coupler constructions, at least two input optical fibers merge or are fused with one another at a coupling region of the optical fiber coupler so that the output light signal or each of such output light signals is a combination or function of the input light signals. The present invention is primarily, but not exclusively, concerned with optical fiber couplers of the latter type, that is, with optical fiber couplers in which mixing of the input light signals takes place.

Optical fiber couplers of the above-discussed type are very sensitive to environmental influences not only because they are made of an optical material, usually glass, which is very fragile, but also because the coupling region proper and its vicinity are usually bare, that is, not provided with a jacket, so that environmental influences could affect the quality of the optical material of the optical fiber coupler and/or of the signals transmitted through the coupler, lest the exposed or bare region of the optical fiber coupler is protected from environmental influences.

In view of the above, it has been already proposed to encase the optical fiber coupler in such a manner as to protect the exposed region from deleterious environmental influences. However, experience with conventional constructions of such coupler-protecting arrangements has shown that they leave much to be desired as far as the protecting function thereof is concerned, especially in military use where the optical fiber coupler and the protective arrangement therefor are often subjected to extremely high or extremely low temperatures and/or very high temperature variations in relatively short periods of time, and/or to vibrations or impacts of considerable magnitudes. Thus, it has been observed that the failure or breakage rate of optical fiber couplers encased in the conventional ways is very high, which presents a severe limitation to the use of conventionally encased optical fiber couplers especially in military communication applications.

SUMMARY OF THE INVENTION

Accordingly, it is a general object of the present invention to avoid the disadvantages of the prior art.

More particularly, it is an object of the present invention to develop a protective arrangement for optical fiber couplers, which does not possess the disadvantages of the conventional arrangements of this type.

Still another object of the present invention is to so construct the protective arrangement of the type here under consideration as to reduce the possibility of damage to the optical fiber coupler to a minimum even under extreme conditions.

It is yet another object of the invention to so design the protective arrangement of the above type as to be simple in construction, inexpensive to manufacture, easy to use, and reliable in operation nevertheless.

A concomitant object of the present invention is to devise a method of manufacturing the optical fiber coupler protecting arrangement of the above type in a simple and rather inexpensive way.

In pursuance of these objects and others which will become apparent hereafter, one feature of the present invention resides in an arrangement for protecting an optical fiber coupler of an optical material which can be damaged if exposed to environmental influences, this arrangement comprising at least one elongated support element extending along the coupler, and means for attaching the coupler to the support at least at two locations spaced from one another longitudinally of the support element. Advantageously, the support element is of a material having a coefficient of thermal expansion close to that of the optical material of the coupler, especially a metallic material, such as an iron-nickel alloy. The support element advantageously has a substantially trough-shaped configuration so as to bound an open channel, so that at least that portion of the coupler which extends between the two locations is received in the open channel. It is especially advantageous when the arrangement further comprises means for encasing the support element and at least that portion of the coupler which is coextensive with the latter, this encasing means advantageously including a rigid housing member bounding a receiving channel dimensioned to receive the support element and the aforementioned part of the coupler with a clearance, and a body of filling material substantially filling the clearance. The trough-shaped support element with the coupler therein may advantageously be surrounded by a shrunk tubular shielding element.

The method according the the present invention of manufacturing a protecting arrangement for an optical fiber coupler of an optical material which can be damaged if exposed to environmental influences comprises the steps of providing a trough-shaped support element with an open channel; placing the coupler into the open channel; adhesively attaching the coupler to the support element in the open channel; surrounding the support element with a tubular shielding element of a shrinkable material; shrinking the shielding element around the trough-shaped support element to form a subassembly; inserting the subassembly with clearance into a receiving channel of a housing member; sealing the open ends of the tubular shielding element around the coupler with respective seals which are so dimensioned as to simultaneously delimit a receiving space in the clearance between the shielding element and the housing member; substantially filling the receiving space with a body of hardenable material to embed the subassembly; and causing the hardenable material to harden.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
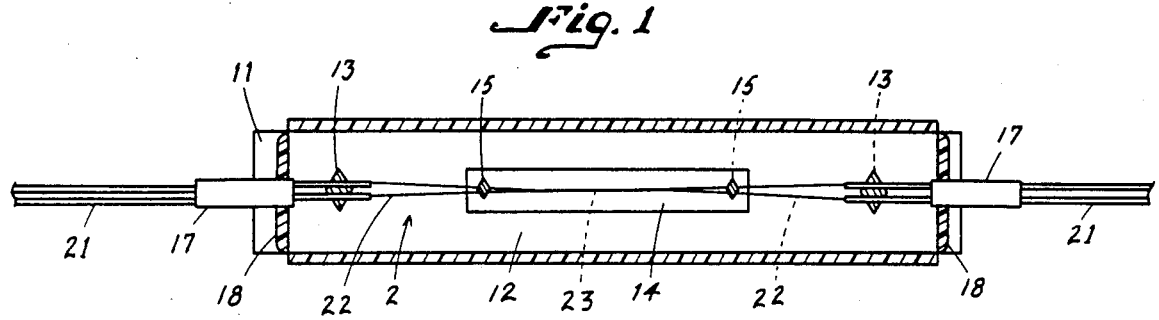
FIG. 1 is a bottom plan view of a subassembly of an optical fiber coupler with a V-shaped support element and an additional strip-shaped support element.

Referring now to the drawing in detail, and first to FIG. 1 thereof, it may be seen that the reference numeral 1 has been used to identify a protective arrangement or subassembly for an optical fiber coupler 2. The arrangement 1 includes, as one of its main components, a trough-shaped support element 11 which is preferably V-shaped in cross section to bound a substantially cross-sectionally triangular open channel 12 receiving a portion of the optical fiber coupler 2. The optical fiber coupler 2 includes respective jacketed input and output portions 21 which are partially received in the open channel 12 of the support member 11. The optical fiber coupler 2 then continues in the axial direction of the open channel 12 by stripped or bare portions 22 which then taper toward and are joined to one another at a merger or coupling region 23. The optical fiber coupler 2 is held in position in the open channel 12 by two bodies 13 of an adhesive, advantageously a heat-cured epoxy adhesive, which are situated at two locations that are spaced from one another longitudinally of the open channel 12 and each of which secures one of the jacketed portions 21 of the optical fiber coupler 2 to the V-shaped or trough-shaped support element 11.

The support element 11 is made of a material having a coefficient of thermal expansion close to that of the optical material of the optical fiber coupler 2. Various metallic materials, especially iron-nickel alloys, satisfy this condition. One metallic material which is especially suited for this purpose and which has been successfully tested is currently being marketed under the trademark Invar. This material is an iron-nickel alloy containing about 64 percent of iron and 36 percent of nickel. However, other metallic materials, especially of the iron-nickel alloy family, are contemplated for use to make the trough-shaped support element 11 therefrom so long as the coefficient of thermal expansion is close to if not identical to that of an optical material of the optical fiber coupler 2. It will be appreciated that it may be desirable if not necessary to use different metallic materials for trough-shaped support elements 11 used with optical fiber couplers 2 of drastically different thermal expansion coefficients but, since there is no requirement for the thermal expansion coefficients of the materials of the support element 11 and of the optical fiber coupler to be exactly equal, there is a certain leeway in selecting the materials; in fact, the same support element material may be used for optical fiber couplers 2 having thermal expansion coefficients within a relatively wide range.

As also shown in FIG. 1, the arrangement 1 may further include a strip-shaped support member 14 which extends along the bare portions 22 and the coupling region 23 of the optical fiber coupler 2, being connected to the bare portions 22 at two zones spaced from one another in the axial direction and situated outside the coupling region 23 and between the locations 13. The connection of the strip-shaped support element 14 to the bare portions 22 is accomplished by respective bodies of adhesive 15 situated at the respective zones. The adhesive may again be heat-curable epoxy and the material of the strip-shaped support element 14 has similar properties as the material of the trough-shaped support element 11 or may even be identical therewith. The strip-shaped support element 14 serves to reinforce the coupling region 23 of the optical fiber coupler 2 prior to and during the introduction of the optical fiber coupler 2 into the open channel 12 of the troughshaped support element 11, and confines the coupling region 23 of the optical fiber coupler 2 between itself and the support element 11 upon assembly. However, the strip-shaped support element 14 is optional and may be omitted when the space available in the open channel 12 is sufficient for securing the bare fibers of the optical fiber coupler 2 directly to the trough-shaped support element 11.

Figure 3:
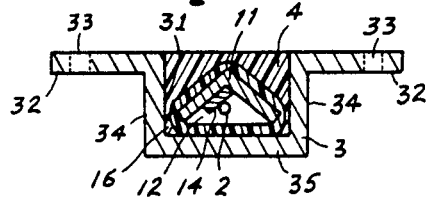
FIG. 3 is a cross-sectional view taken along line III—III of FIG. 2 but subsequent to embedding.

As a comparison of FIGS. 1 and 3 will reveal, a tubular shielding element 16 surrounds the trough-shaped support element 11 over most if not all of the axial length of the latter. At least as applied to the trough-shaped support 11, the tubular shielding element 16 has a non-circular cross section which, as may be seen in FIG. 3, conforms to the outline of the trough-shaped support element 11 except for a portion of the shielding element 16 which spans the open side of the open channel 12, that is, extends across the open side of the channel 12. It is currently preferred to make the shielding element 16 of a shrinkable material, and to shrink the same in place so as to obtain a tight contact between the external surfaces of the trough-shaped support element 11 and the internal surface of the shielding element 16.

It may also be seen in FIG. 1 that a region of each of the jacketed portions 21 of the optical fiber coupler 2 is surrounded, in each instance, by a tubular bend limiter 17. The bend limiter 17 is preferably also of a shrinkable material and is shrunk in place on the respective jacketed portion 21 of the optical fiber coupler 2. The respective bend limiter 17 is shown to extend from the interior of the tubular shielding element 16 to beyond the trough-shaped support element 11. It reinforces the optical fiber coupler 2 in this area and limits the extent of bending of the optical fiber coupler 2.

Since the shielding element 16 spans the open side of the channel 12, a gap exists between the shielding element 16 and the bend limiter 17 at each of the ends of the shielding element 16. This gap is shown in FIG. 1 to be filled with a seal, especially by a body of an RTV sealant, which separates the interior of the shielding element 16 from its exterior. Thus, ambient air is prevented from entering the interior of the shielding element 16 and thus the bare fiber portions 22 and the coupling region 23 of the optical fiber couplers 2. If desired, either the shielding element 16 or the seals 18, or both, may be of an opaque material, so that even ambient light is prevented from reaching the bare optical fibers of the optical fiber coupler 2 therethrough.

Figure 2:
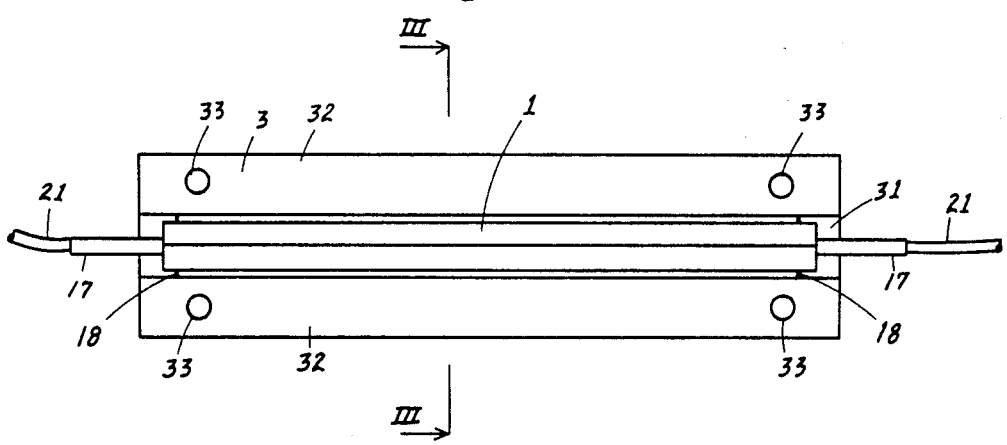
FIG. 2 is a top plan view of a package including the subassembly of FIG. 1 received in a receiving channel of a housing member, prior to embedding.

The arrangement as discussed so far already gives optical fiber couplers a measure of protection which may be sufficient for certain applications or uses of the optical fiber coupler 2. However, for more demanding applications, such as those encountered especially in the military use, an additional protection may be needed. Thus, as shown in FIGS. 2 and 3, the above-discussed protective arrangement 1 assembled with the optical fiber coupler 2 is used as a sub-package which is inserted into a receiving channel 31 of a housing member 3. As may best be seen in FIG. 3, the housing 3 has two lateral portions 32 which are shown to be configurated as flanges. The lateral portions 32 are provided with holes 33 through which screws or similar fasteners may be passed to mount the housing 3 on a supporting structure. However, it will be appreciated that the lateral portions 32 could also extend over the entire height of the housing 3 for additional reinforcement purposes.

As illustrated in FIG. 3, the housing 3 has two lateral walls 34 and a bottom or interconnecting wall 35 extending between and merging with the lateral wall 34. The walls 34 and 35 together bound the receiving channel 31. FIG. 3 also shows that the trough-shaped or V-shaped support element 11 is so received in the receiving channel 31 that the open side of the channel 12 thereof faces downwardly, that is, toward the interconnecting wall 35. Of course, the portion of the shielding element 16 which spans the open side of the open channel 12 is interposed between the support element 11 and the bottom wall 35 of the housing member 3. Then, the entire sub-package is encased in a body 4 of an encapsulant especially of a resilient, opaque and encapsulant.

The body 4 may fill the entire remainder of the receiving channel 31 left after the above-mentioned sub-package has been introduced into the receiving channel 31, in which case the seals 18 prevent the encapsulating material from entering the interior of the tubular shielding element 16. Alternatively, as shown in FIG. 2, the seals 18 may have portions which are so dimensioned as to sealingly contact the surfaces bounding the receiving channel 31, thus axially delimiting a receiving space substantially coextensive with the shielding element 16 in the receiving channel 31. In this case, only the aforementioned receiving space need be filled with the encapsulant.

Having so described the construction of the protecting arrangement or package for the optical fiber coupler 2, the currently preferred method of manufacturing the same will now be briefly discussed. If the strip-shaped support element 14 is to be used, it is attached to the bare portion 22 of the optical fiber coupler 2 by the respective adhesive bodies 15 situated just outside the tapering or coupling region 23 of the optical fiber coupler 2 first, followed by hardening of the bodies 15 of adhesive. This hardening may be caused or accelerated by applying heat to the adhesive bodies 15 or to the strip-shaped support element 14, or both, such as by using a heat gun or a heated fixture. Then, the resulting article is introduced into the open recess 12 of the trough-shaped support element 11 and is secured therein by the respective bodies 13 of adhesive. This adhesive may again be cured, or its curing may be accelerated, by applying heat to the zones at which the bodies 13 are situated, by a heat gun or a heated structure. Once this is accomplished, the shielding element 16 of a shrinkable material is slid over the trough-shaped support element 11 and is shrunk in the desired position. This is followed by situating the bent limiters 17 at the desired locations, and by causing the same to shrink to tightly embrace the jacketed portions 21 of the optical fiber coupler 1. This is followed by filling the gaps between the reinforcing element 16 and the bend limiters 17 by the seals 18.

The resulting sub-assembly or sub-package is then introduced into the receiving channel 31 of the housing member 3 in the above-mentioned orientation, and is properly aligned therein. Then, a body of the encapsulate, which is then in its flowable state, is poured into the receiving channel 31 or into the receiving space until it fills the receiving channel 31 or the receiving space. Then, the body 4 is permitted or caused to cure within the confines of the receiving channel 31. This completes the manufacture of the heavy-duty construction of the optical fiber coupler/protective arrangement article, which is then ready for storage, transportation and/or use.

While I have described above the principles of my invention in connection with specific apparatus, it is to be clearly understood that this description is made only by way of example and not as a limitation to the scope of my invention as set forth in the accompanying claims.

I claim:

1. A packaged optical fiber coupler comprising:
   a plurality of optical fibers each including jacketed portions separated by a respective unjacketed portion, the unjacketed portions of the fibers being formed of a fragile optical material and being fused together along a length thereof for coupling light from one fiber to another fiber;
   a generally trough-shaped support element having open end areas opposite each other, said support element being formed by comprising a pair of side walls interconnected along adjacent elongated edges and spaced apart along the edges opposite the interconnected edges to form an open top area therebetween, said support element being formed of a nickel-iron alloy having about 36% nickel and about 64% iron;
   a protective shield formed of a plastic material and extending around the outer surface of each of said side walls and across the open top area between said opposite edges, the interior portions of said trough-shaped support element and said protective shield thereby defining a protected inner area to protect the fused length of said fibers, and
   a housing in which said support element is mounted, the unjacketed portions of said fibers being adhesively secured within the trough formed by the side walls of said support element so that said fibers extend through said open end areas and beyond said support element to support and protect said fused length contained within said protected area from thermal shock,
   wherein said housing provides additional protection to said fused region.

2. A packaged optical fiber coupler in accordance with claim 1 further including a pair of tubular bend limiters, one of said bend limiters surrounding one of said jacketed portions and the other of said bend limiters surrounding the other end of said jacketed portions.

3. A packaged optical fiber coupler in accordance with claim 1 wherein said housing is formed by a pair of side wall members interconnected along adjacent elongated edges and spaced apart along the edges opposite the interconnected edges to form an open area, said support element being secured in said housing with the open area between said opposite edges of said support element being adjacent the interconnected edges of said housing.

4. A packaged optical fiber coupler in accordance with claim 3 wherein a body of encapsulant material fills the inside of said housing and surrounds said support element.

5. A packaged optical fiber coupler in accordance with claim 3 wherein said opposite edges of said housing have flanges extending therefrom.

6. A packaged optical fiber coupler in accordance with claim 3 wherein the opposite ends of said housing include tubular bend limiters through which the jacketed portions of said fibers extend.

7. A packaged optical fiber coupler comprising:
   a plurality of optical fibers each including jacketed portions separated by a respective unjacketed portion, the unjacketed portions of the fibers being formed of a fragile optical material having a first thermal coefficient of expansion and being fused together along a length thereof for coupling light from one fiber to another fiber;
   a generally trough-shaped support element having open end areas opposite each other, said support element comprising a pair of side walls interconnected along adjacent elongated edges and spaced apart along the edges opposite the interconnected edges to form an open area therebetween, said support element being formed of a metallic alloy having a second coefficient of thermal expansion, the difference between said first and second coefficients of thermal expansion being not greater than the difference between the thermal coefficient of expansion of glass and the thermal coefficient of expansion of a nickel-iron alloy having about 36% nickel and about 64% iron;
   a protective shield extending around the outer surface of each of said side walls and across the open top area between said opposite edges, the interior portions of said trough-shaped support element and said protective shield thereby defining a protected inner area to protect the fused length of said fibers; and
   a strip-shaped support member also formed of said metallic alloy and located entirely within said protected inner area;
   wherein the unjacketed portions of the optical fibers are adhesively secured to said strip-shaped support member at two spaced apart locations, one of which is adjacent one end of the fused length and the other of which is adjacent the other end of the fused length to support and protect said fused length from thermal shock,
   the unjacketed portions of said fibers being adhesively secured within the trough defined by said trough-shaped support element in the vicinity of either end thereof so that said fibers extend through said open end areas and beyond said support element to further support and protect said fused length and said strip-shaped support member contained within said protected area from thermal shock.

8. A packaged optical fiber coupler in accordance with claim 7 wherein said protective shield is made of a shrinkable material that is shrunk in place to provide tight contact between said support element and said shield.

* * * * *